US012621512B2

(12) United States Patent
Chadwick et al.

(10) Patent No.: US 12,621,512 B2
(45) Date of Patent: *May 5, 2026

(54) METHOD FOR JUST-IN-TIME TRANSCODING OF BYTERANGE-ADDRESSABLE PARTS

(71) Applicant: Mux, Inc., San Francisco, CA (US)

(72) Inventors: Nick Chadwick, San Francisco, CA (US); Matthew Szatmary, San Francisco, CA (US); Adam Brown, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,367

(22) Filed: Jun. 18, 2024

(65) Prior Publication Data

US 2024/0340473 A1     Oct. 10, 2024

Related U.S. Application Data

(63) Continuation of application No. 18/124,507, filed on Mar. 21, 2023, now Pat. No. 12,052,448, which is a
(Continued)

(51) Int. Cl.
*H04N 7/173* (2011.01)
*H04N 21/234* (2011.01)
(Continued)

(52) U.S. Cl.
CPC .............. *H04N 21/234336* (2013.01); *H04N 21/23418* (2013.01); *H04N 21/2387* (2013.01); *H04N 21/26258* (2013.01)

(58) Field of Classification Search
CPC ..... H04N 21/234336; H04N 21/23418; H04N 21/2387; H04N 21/26258;
(Continued)

(56) References Cited

U.S. PATENT DOCUMENTS 9,819,972 B1 * 11/2017 Vantalon .............. H04N 21/643
9,942,578 B1 * 4/2018 Vantalon ............ H04N 21/4302
(Continued)

*Primary Examiner* — Annan Q Shang
(74) *Attorney, Agent, or Firm* — Run8 Patent Group, LLC; Peter Miller; Madison Tyrcha

(57) ABSTRACT

A method including: ingesting a video segment and a set of video features of the video segment; estimating a part size distribution for the video segment based on the set of video features and a first rendition of the video segment; calculating a maximum expected part size based on a threshold percentile in the part size distribution; at a first time, transmitting, to an video player, a manifest file indicating a set of byterange-addressable parts of the video segment in the first rendition, each byterange addressed part characterized by the maximum expected part size; at a second time, receiving, a playback request for a first byterange-addressable part; transcoding the first byterange-addressable part; in response to the maximum expected part size exceeding a size of the first byterange-addressable part in the first rendition, appending padding data to the first byterange-addressable part; and transmitting the first byterange-addressable part to the AV player.

20 Claims, 7 Drawing Sheets

Related U.S. Application Data continuation of application No. 17/842,667, filed on Jun. 16, 2022, now Pat. No. 11,641,496, which is a continuation-in-part of application No. 16/458,630, filed on Jul. 1, 2019, now Pat. No. 11,653,040.

(60) Provisional application No. 63/211,419, filed on Jun. 16, 2021, provisional application No. 62/694,408, filed on Jul. 5, 2018.

(51) Int. Cl.
| | | |
|---|---|---|
| *H04N 21/2343* | (2011.01) | |
| *H04N 21/2387* | (2011.01) | |
| *H04N 21/262* | (2011.01) | |

(58) Field of Classification Search
CPC .......... H04N 21/23439; H04N 21/8456; H04L 65/612; H04L 65/65; H04L 65/70; H04L 65/762; H04L 65/80
See application file for complete search history.

(56) References Cited

U.S. PATENT DOCUMENTS

| | | | |
|---|---|---|---|
| 2015/0221316 A1* | 8/2015 | Mufti .................... | G10L 19/018 |
| | | | 700/94 |
| 2016/0072637 A1* | 3/2016 | Gholmieh .......... | H04N 21/8456 |
| | | | 709/219 |
| 2017/0180800 A1* | 6/2017 | Mayrand ............. | H04N 21/454 |
| 2019/0069038 A1* | 2/2019 | Phillips ............ | H04N 21/64769 |
| 2023/0350202 A1* | 11/2023 | Mayrand ............. | H04N 23/661 |

* cited by examiner

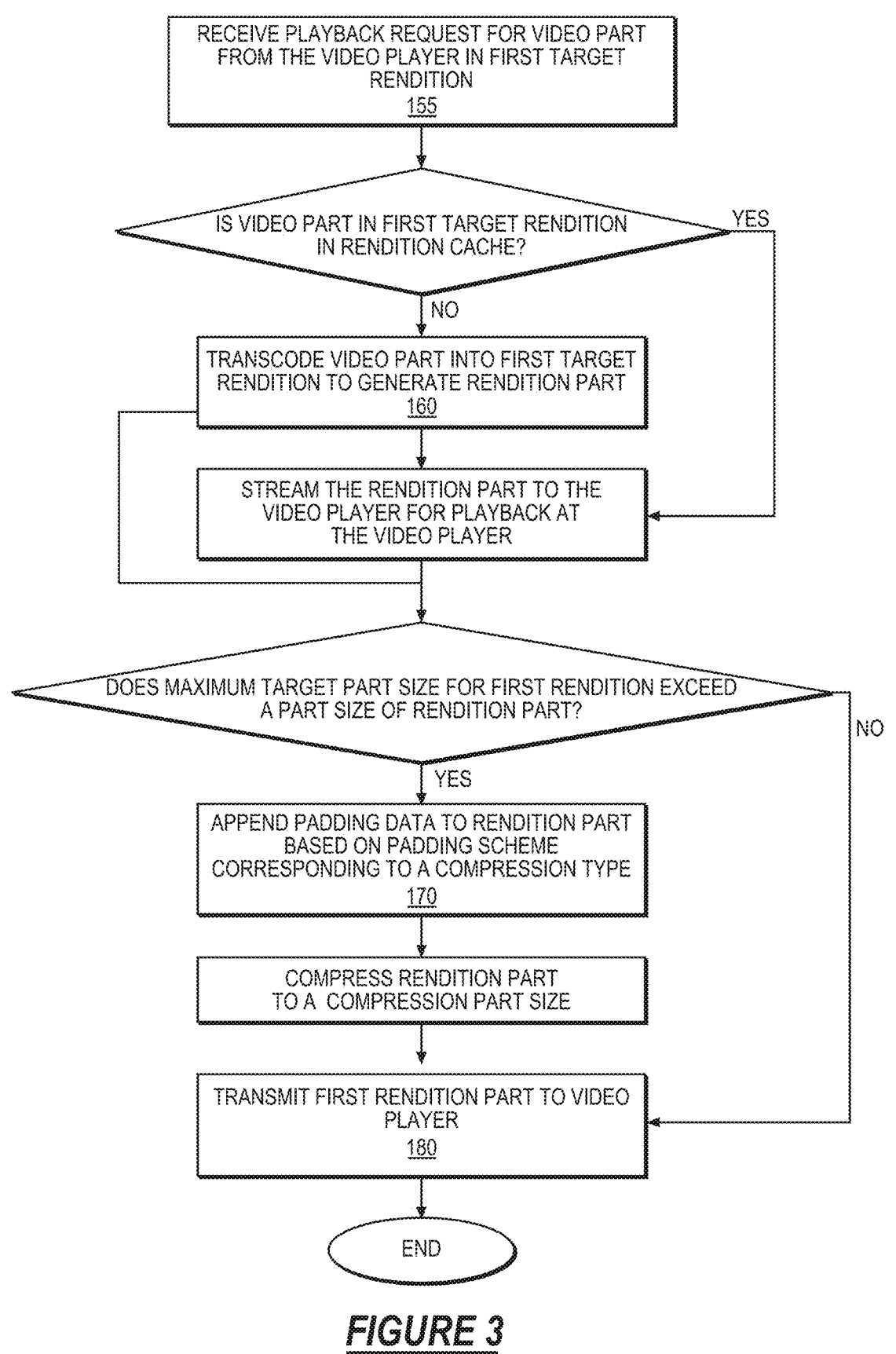

RECEIVE PLAYBACK REQUEST FOR VIDEO PART
FROM THE VIDEO PLAYER IN FIRST TARGET
RENDITION
155

IS VIDEO PART IN FIRST TARGET RENDITION
IN RENDITION CACHE?

YES

NO

TRANSCODE VIDEO PART INTO FIRST TARGET
RENDITION TO GENERATE RENDITION PART
160

STREAM THE RENDITION PART TO THE
VIDEO PLAYER FOR PLAYBACK AT
THE VIDEO PLAYER

DOES MAXIMUM TARGET PART SIZE FOR FIRST RENDITION EXCEED
A PART SIZE OF RENDITION PART?

NO

YES

APPEND PADDING DATA TO RENDITION PART
BASED ON PADDING SCHEME
CORRESPONDING TO A COMPRESSION TYPE
170

COMPRESS RENDITION PART
TO A COMPRESSION PART SIZE

TRANSMIT FIRST RENDITION PART TO VIDEO
PLAYER
180

END

*FIGURE 3*

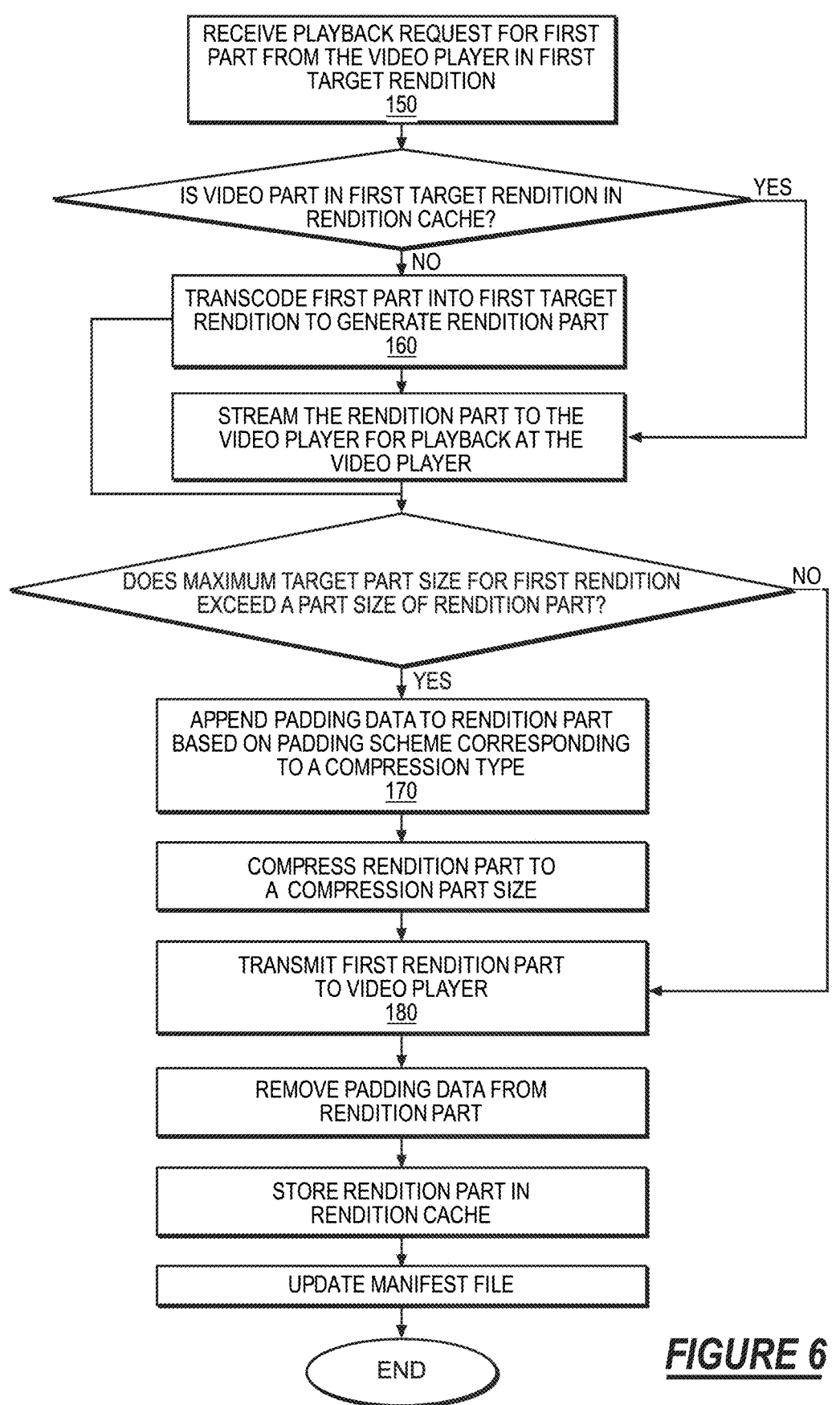

RECEIVE PLAYBACK REQUEST FOR FIRST
PART FROM THE VIDEO PLAYER IN FIRST
TARGET RENDITION
150

IS VIDEO PART IN FIRST TARGET RENDITION IN
RENDITION CACHE?

YES

NO

TRANSCODE FIRST PART INTO FIRST TARGET
RENDITION TO GENERATE RENDITION PART
160

STREAM THE RENDITION PART TO THE
VIDEO PLAYER FOR PLAYBACK AT THE
VIDEO PLAYER

DOES MAXIMUM TARGET PART SIZE FOR FIRST RENDITION
EXCEED A PART SIZE OF RENDITION PART?

NO

YES

APPEND PADDING DATA TO RENDITION PART
BASED ON PADDING SCHEME CORRESPONDING
TO A COMPRESSION TYPE
170

COMPRESS RENDITION PART TO
A COMPRESSION PART SIZE

TRANSMIT FIRST RENDITION PART
TO VIDEO PLAYER
180

REMOVE PADDING DATA FROM
RENDITION PART

STORE RENDITION PART IN
RENDITION CACHE

UPDATE MANIFEST FILE

END

*FIGURE 6*

METHOD FOR JUST-IN-TIME TRANSCODING OF BYTERANGE-ADDRESSABLE PARTS

CROSS-REFERENCE TO RELATED APPLICATIONS

This Application is a continuation of U.S. patent application Ser. No. 18/124,507, filed on 21 Mar. 2023, which is a continuation of U.S. patent application Ser. No. 17/842,667, filed on 16 Jun. 2022, which claims the benefit of U.S. Provisional Application No. 63/211,419, filed on 16 Jun. 2021, each of which is incorporated in its entirety by this reference.

U.S. patent application Ser. No. 17/842,667 is also a continuation-in-part application of U.S. patent application Ser. No. 16/458,630 filed on 1 Jul. 2019, which claims the benefit of U.S. Provisional Application No. 62/694,408, filed on 5 Jul. 2018, each of which is incorporated in its entirety by this reference.

TECHNICAL FIELD

This invention relates generally to the field of internet video streaming and more specifically to a new and useful method for just-in-time transcoding of byterange-addressable parts in the field of internet video streaming.

BRIEF DESCRIPTION OF THE FIGURES

FIG. 3 is a flowchart representation of the method;
FIG. 6 is a flowchart representation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
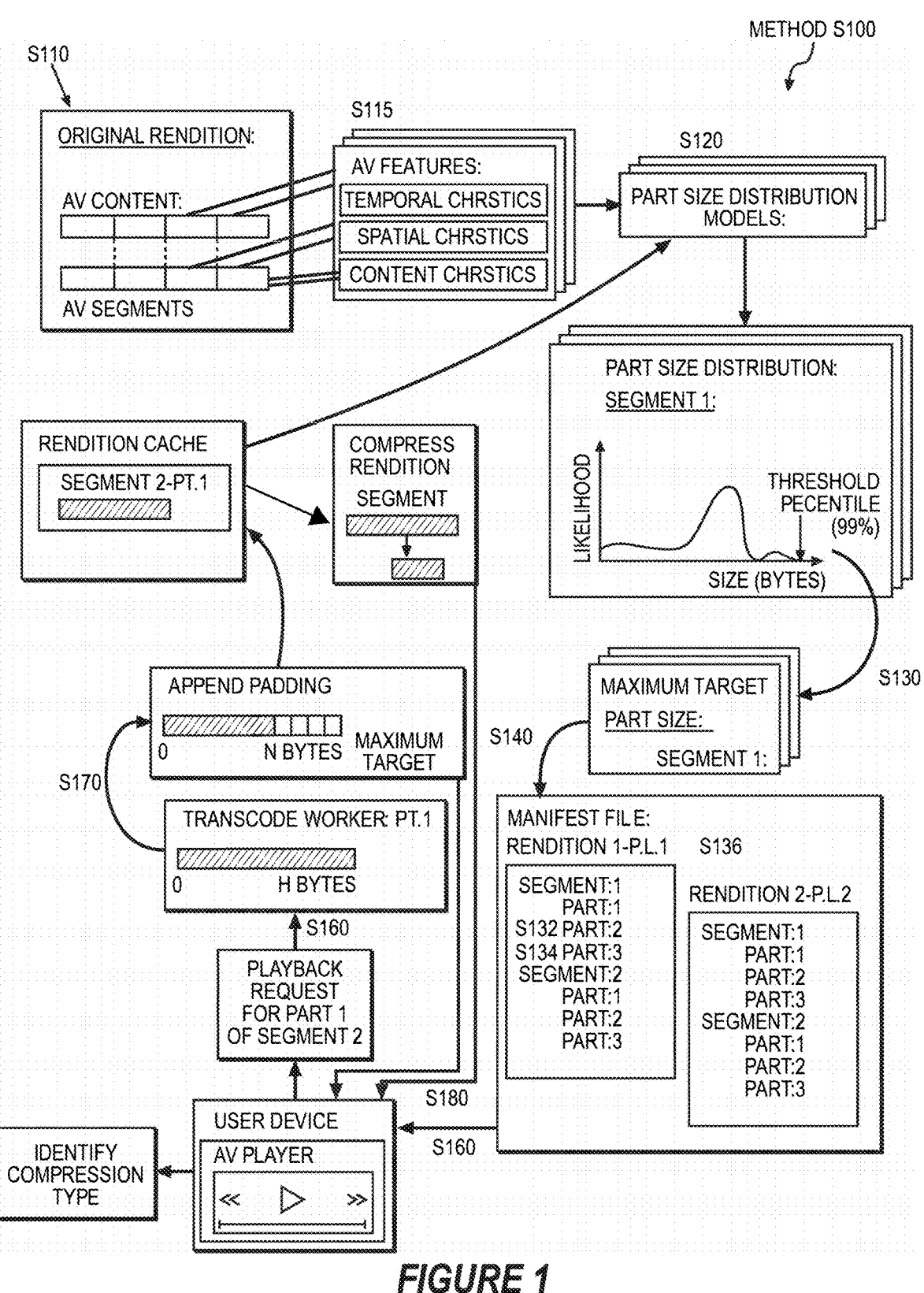
FIG. 1 is a schematic representation of a method.
Figure 2:
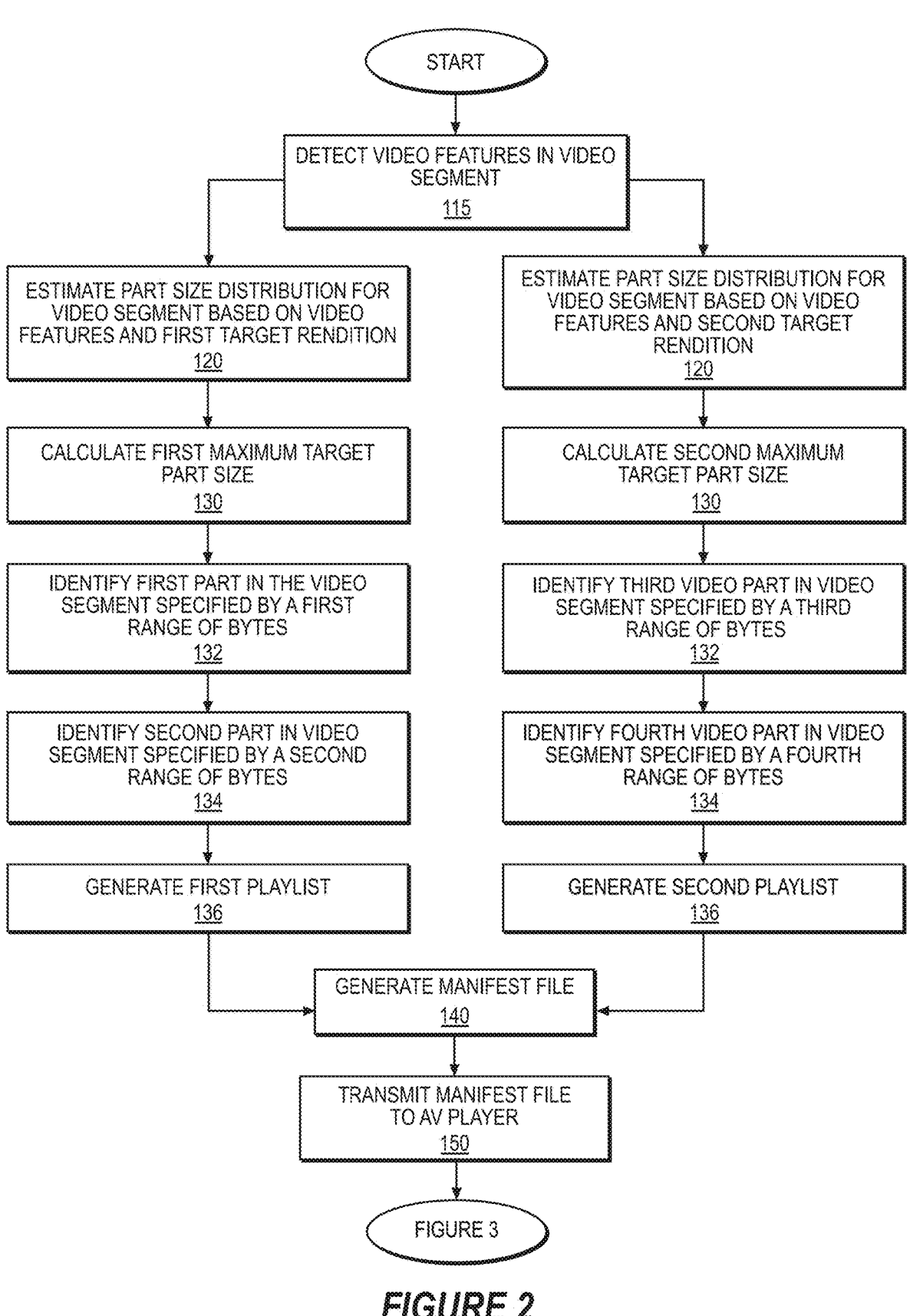
FIG. 2 is a flowchart representation of the method.
Figure 4:
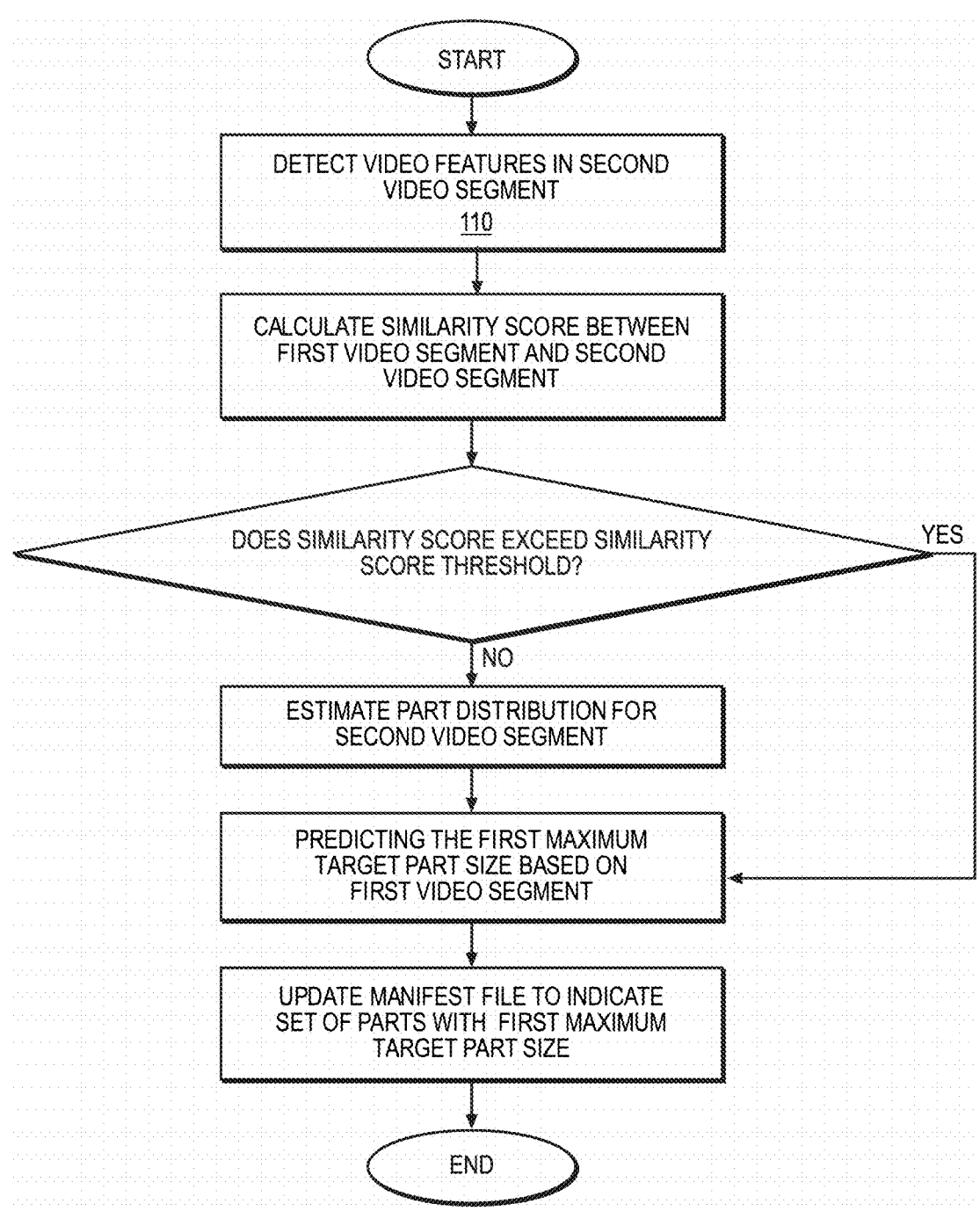
FIG. 4 is a flowchart representation of the method.
Figure 5:
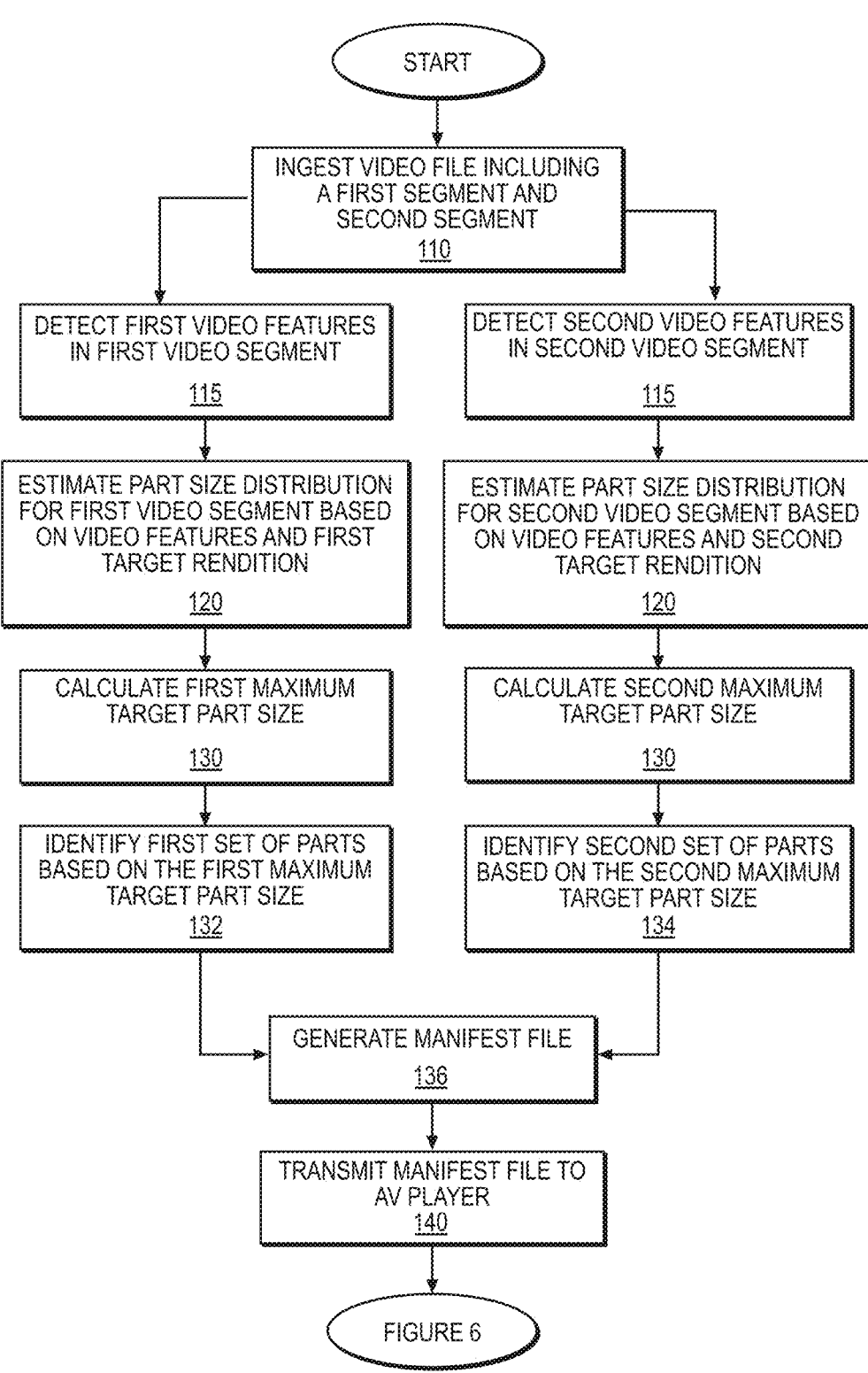
FIG. 5 is a flowchart representation of the method.
Figure 7:
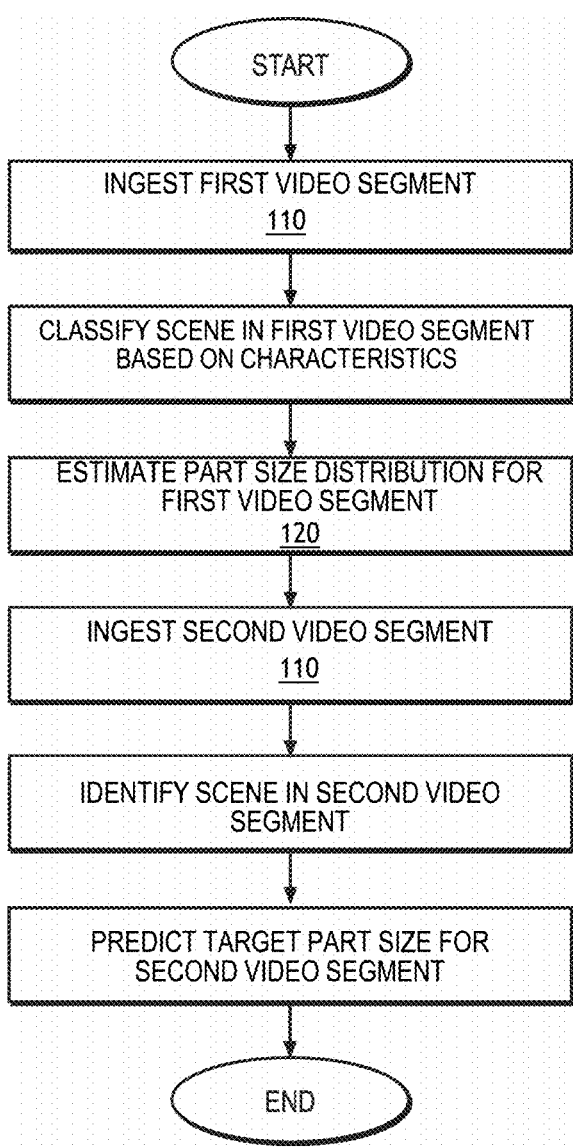
FIG. 7 is a flowchart representation of the method.

As shown in FIG. 1, a method for S100 includes: ingesting an AV segment in an original rendition and a set of AV features of the AV segment in Block Silo; estimating a part size distribution for the AV segment based on the set of AV features of the AV segment and a first rendition of the AV segment in Block S120; calculating a maximum expected part size based on a threshold percentile in the part size distribution in Block S130; at a first time prior to transcoding the AV segment, transmitting, to an AV player, a manifest file indicating a set of byterange-addressable parts of the AV segment in the first rendition, each byterange addressed part characterized by the maximum expected part size in Block S140; at a second time, receiving, from the AV player, a playback request for a first byterange-addressable part in the set of byterange addressed parts via the manifest file in Block S150; transcoding the first byterange-addressable part in Block S160; in response to the maximum expected part size exceeding a size of the first byterange-addressable part in the first rendition, appending padding data to the first byterange-addressable part in Block S170; and transmitting the first byterange-addressable part to the AV player in Block S180.

One variation of the method S100 includes: detecting a set of video features in a first video segment in Block S115; estimating a first part size distribution of the first video segment based on the set of video features and a first target rendition in Block S120; estimating a second part size distribution of the first video segment based on the set of video features and a second target rendition in Block S120; calculating a first maximum target part size based on a threshold percentile in the first part size distribution for the first target rendition in Block S130; and calculating a second maximum target part size based on the threshold percentile in the second part size distribution for a second target rendition in Block S130. In this variation, the method S100 further includes: at a first time, for the first target rendition, identifying a first part in the first video segment specified by a first range of bytes based on the first maximum target part size in Block S132; identifying a second part in the first video segment specified by a second range of bytes based on the first maximum target part size in Block S134; generating a first playlist by aggregating the first part and the second part in the first video segment in Block S136; and, for the second target rendition, identifying a third part in the first video segment specified by a third range of bytes based on the second maximum target part size in Block S132; identifying a fourth part in the first video segment specified by a fourth range of bytes based on the second maximum target part size in Block S134; and generating a second playlist by aggregating the third part and the fourth part in the second video segment in Block S136. In this variation, the method S100 further includes: generating a manifest file by aggregating the first playlist and the second playlist in Block S140; transmitting the manifest file to a video player in Block S150; at a second time, receiving a first playback request for the first part from the video player in Block S155; in response to absence of the first part in the first target rendition in a rendition cache, transcoding the first part in the first segment into the first target rendition to generate a first rendition part in Block S160; in response to the first maximum target part size exceeding a first part size of the first rendition part, appending a first set of padding data to the first rendition part in Block S170; and transmitting the first rendition part to the video player in Block S180.

One variation of the method S100 includes: ingesting a first video file including a first video segment and a second video segment in Block S110; detecting a first set of spatial and temporal characteristics in the first video segment in Block S115; detecting a second set of spatial and temporal characteristics in the second video segment in Block S115; estimating a first part size distribution of the first video segment based on the first set of characteristics and a first target rendition in Block S120; estimating a second part size distribution of a second video segment based on the second set of characteristics and the first target rendition in Block S120; calculating a first maximum target part size based on a first threshold percentile in the first part size distribution for the first video segment in Block S130; and calculating a second maximum target part size based on a second threshold percentile in the second part size distribution for the second video segment in Block S130. In this variation, the method S100 further includes: at a first time, for the first target rendition, generating a manifest file by identifying a first set of parts specified by a first byterange based on the first maximum target part size for the first video segment in Block S132; identifying a second set of parts specified by a second byterange based on the second maximum target part size for the second video segment in Block S134; and aggregating the first and second set of parts in Block S136. In this variation, the method S100 further includes: transmitting the manifest file to a video player in Block S140; at a second time, receiving a first playback request for a first part in the first set of parts, from the video player in Block S150; in response to absence of the first part in the first target rendition in a rendition cache, transcoding the first part into the first target rendition to generate a first rendition part in Block S160; in response to the first maximum target part size exceeding a first rendition part size of the first rendition part, appending a first set of padding data to the first rendition part in Block S170; and transmitting the first rendition part to the video player in Block S180.

One variation of the method S100 includes: ingesting a first video segment associated with a first set of video features in Block Silo; estimating a part size distribution for the first video segment based on the first set of video features and a first target rendition of the first video segment in Block S120; calculating a target part size based on a threshold percentile in the part size distribution in Block S130; and, at a first time prior to transcoding the first video segment, transmitting, to a video player, a manifest file indicating a set of parts of the first video segment in the first rendition, each part characterized by the target part size in Block S140. In this variation, the method S100 further includes: at a second time, receiving, from the video player, a playback request for a first part in the set of parts via the manifest file in Block S150; generating a first rendition part in the first target rendition by transcoding the first part in Block S160; in response to the target part size exceeding a size of the first rendition part, appending a first set of padding data to the first rendition part, the first set of padding data based on a first compression type in Block S170; and, in response to compressing the first rendition part to a first compressed part, transmitting the first compressed part to the video player in Block S182.

2. Applications

Generally, a system (e.g., a server, a computer network) can execute Blocks of the method S100 to just-in-time transcode byterange-addressable parts of an audiovisual or AV segment (hereinafter "video segment") in order to serve requests from audiovisual players (hereinafter "AV players") for a set of byterange-addressable parts without previously maintaining a cached copy of the AV segment within a rendition cache. The method S100 leverages internet streaming technology that enables AV player requests for specific byteranges corresponding to a "part" of an AV segment, such as the Low-Latency HTTP Live Streaming (hereinafter "LL-HLS") protocol, in order to just-in-time transcode and serve byterange-addressable parts to requesting AV players. More specifically, the system, prior to transcoding an AV segment, can generate a predicted byterange or distribution of predicted byteranges for a part in the AV segment and include this predicted byterange in a manifest file for transmission to the AV player. Upon receiving a request for a particular byterange-addressable part in the AV segment based on the manifest file, the system can: transcode the AV segment to generate the requested part; insert padding data to ensure that the byterange of the newly generated part matches the predicted byterange of the part; and serve the byterange-addressable part to the requesting AV player. Thus, the system can just-in-time transcode and deliver AV content to requesting AV players with low-latency (e.g., less than 500 milliseconds), without requiring prior transcoding of the AV content, and without causing playback errors due to inconsistencies between the predicted byterange indicated by the manifest file and the actual byterange of the delivered part in the AV segment.

Generally, by delaying transcoding of an AV segment until request time, the system can reduce compute and storage resources allocated to the AV segment prior to requested playback of the AV segment and eliminate compute resources allocated to those AV segments that are not requested for playback. For example, upon uploading AV content for internet streaming, the system can initially store only the original rendition of the AV content instead of storing all advertised renditions of the AV content in anticipation of a request for any of these renditions, thereby reducing storage costs for the intervening time between initial upload and initial request for the AV content. In another example, the system can invest compute resources to transcoding an AV segment when a part of this AV segment is requested instead of pre-transcoding the AV segment into multiple advertised renditions in preparation for a request, thereby reducing costs associated with transcoding video segments that are uploaded to the system but not requested (e.g., AV segments with zero views or zero live viewers).

Additionally, by enabling just-in-time transcoding of subsegment parts of an AV segment, the system can further reduce latency of a just-in-time transcoding process. For example, the system can, in response to a playback request for AV content, transcode a single byterange-addressable part (instead of the whole AV segment) prior to beginning delivery of AV content to the AV player. In this example, the system reduces latency to the transcoding duration of a 500-millisecond part instead of the transcoding duration of a two-second AV segment (a reduction of approximately 75%). When, the system executes the method S100 for AV content included in a livestream, the system can directly reduce the latency between AV capture of the livestream and delivery to viewers of the livestream. For recorded AV content, the system reduces wait time for first-time viewers of the recorded AV content.

Additionally, or alternatively, the system can predict conservative (e.g., 99th percentile) but accurate byteranges for byterange-addressable parts listed in the manifest file for the AV segment, in order to prevent playback errors while also minimizing the amount of padding added to each byterange-addressable part delivered to the requesting AV player. The system accomplishes this by training and/or executing a part size prediction model, which outputs a likely distribution of part sizes based on a set of features representing the AV content and a target rendition for the AV content. Thus, the system can accurately predict the output of the transcoder based on extracted features of the AV content.

Furthermore, the system can append padding data to transcoded rendition parts based on padding schemes specific to video compression types. For example, the system can identify a video compression type for a corresponding AV player and select a padding scheme for the transcoded rendition part. Therefore, the system can reduce playback errors—such as strobing—at the AV player by padding the rendition parts with padding data compatible with the video compression type of the AV player requesting the playback segments. The system can then compress the rendition segment appended with the padding data to generate a compressed rendition segment based on the compression type and transmit the compressed rendition segment to the AV player. Therefore, the system can reduce computational load and reduce bandwidth of sending the rendition parts to the AV player for playback.

3. Terminology

Generally, the method S100 is described with respect to AV content, AV segments, and byterange-addressable parts of AV segments. The term "AV content" refers to a static AV file uploaded to a cache maintained by the system or a dynamic AV livestream that is cached in an original rendition.

The term "AV segment" (e.g., an HLS or LL-HLS segment) refers to a set of frames of the AV content (i.e., a Group of Pictures) including an I-frame, which the system can transcode independently of other segments of the AV file. The system can store each AV segment as a separate file within a "playlist" for delivery to an AV player via a content delivery network (hereinafter "CDN").

The term "byterange-addressable part" refers to a part of an AV segment specified by a range of bytes within an AV segment. Therefore, the system can define a byterange-addressable part between bytes 1000 and 3000 of an AV segment, which includes bytes 1000 through 2999 of the AV segment. Thus, AV players can request these byterange-addressable parts of specific AV segments advertised in a playlist for the AV content.

Generally, a "rendition" of an AV segment, as referred to herein, defines a quality level, a combination of a bitrate and a resolution (i.e., a bitrate-resolution pair), for the AV segment, indicated in a manifest file (e.g., an HLS manifest). Additionally, or alternatively, a rendition can define a format, codec, or version (e.g., an audio only version) of the AV segment. Therefore, the system can transcode an AV segment from an original rendition (or mezzanine version) of the AV segment to another rendition prior to delivery to a requesting AV player to enable timely transmission of the AV segment to an AV player for playback by the AV player. The system can just-in-time transcode and/or store multiple renditions of a single AV segment other than the original rendition to enable AV players to request a rendition that matches the viewing conditions (e.g., mobile viewing over a cellular network, static viewing on a large display) of the AV player via adaptive bitrate streaming technology. The system can receive requests for AV segments or byterange-addressable parts of AV segments in any rendition advertised to the AV player. Generally, the system can just-in-time transcode an AV segment or byterange-addressable part into a rendition currently requested by an AV player. Additionally, the system can predict byterange-addressable part sizes for AV segments based on a "target rendition" for the AV segment in order to account for differences in part sizes between higher-quality and lower-quality renditions of an AV segment.

Generally, the system can "advertise" the availability of AV segments and byterange-addressable parts of these AV segments in a set of renditions to an AV player by transmitting a manifest file that defines a playlist of AV segments for each rendition in which the AV content is available. The system also transmits a manifest file that defines byteranges for each byterange-addressable part in each AV segment prior to transcoding these AV segments. Therefore, in an application in which AV content is available for streaming in five renditions, the system can generate and transmit a manifest file defining five playlists of AV segments and byterange-addressable parts of AV segments for request by the AV player.

Generally, the system can append "padding data" to one or both ends of each transcoded part in response to the maximum target part size exceeding a size of the byterange-addressable part in the requested rendition. The system can define padding data via a padding scheme specifying a string of fixed repeated values or random values. The system can append a padding scheme to the transcoded byterange-addressable part based on a type of video compression associated with a type of AV player and target rendition. Thus, the system can reduce errors at the AV player during playback of a transcoded part in a target rendition.

Generally, the system can "compress" a transcoded byterange-addressable part into a compressed part by encoding the transcoded byterange-addressable part in a format that consumes less space than the original transcoded part. The system can transmit the compressed part to the AV player. More specifically, the system can implement a codec to compress the transcoded parts based on a target rendition. Therefore, the system can reduce storage complexity and resources associated with sending the transcoded parts with padding data to the AV players for playback.

4. AV Content Ingest

Generally, the system can ingest AV content including multiple video segments in an original rendition in Block S110. For example, the system can ingest a first video file including a first video segment and a second video segment. Additionally, while ingesting an AV segment in an original rendition, the system can extract and calculate a set of AV features describing the AV segment. Thus, the system can receive and characterize new AV content for low-latency just-in-time delivery to requesting AV players.

In one implementation, the system can ingest pre-recorded AV content by simply uploading a preexisting AV file representing the original AV content. In this implementation, the system can segment the ingested AV file into a set of AV segments (e.g., via keyframe segmentation) in an original rendition. Alternatively, the system can ingest AV files, which have already been segmented into a set of AV segments.

In another implementation, the system can receive AV content from a livestream in real-time. In this implementation, the system can receive individual AV segments or individual parts of segments in an original rendition as these AV segments are recorded and subsequently uploaded to the system for transcoding into multiple renditions.

5. Video Features

Generally, upon ingesting AV content, including a set of AV segments in an original rendition, the system can extract a set of AV or video features descriptive of the AV content or each video segment on a per-segment basis in Block S115. The system can extract a set of video features that represent spatial, visual, motion, and content characteristics of the AV content or video segment. For example, the system can detect a first set of spatial and temporal characteristics in a first video segment; and detect a second set of spatial and temporal characteristics in the second video segment. Thus, the system can predict byterange-addressable part sizes for each segment based on characteristics specific to each video segment.

In one implementation, the system can select a set of frames from the ingested AV content from which to extract AV features. More specifically, the system can sample a sequence of frames from a video segment at a predetermined sampling interval within the AV content (e.g., one frame for every second of the AV content) up to a maximum number of frames (e.g., 100 frames). In one variation, the system can identify groups-of-pictures (hereinafter "GOPs") in the original encoding of the input video and extract at least one frame from each GOP or can sample the GOPs (e.g., the I-frame of each GOP) up to a maximum number of frames. More specifically, the system can identify a set of GOPs in the video segment; and sample the I-frame from each GOP in the AV segment. In yet another implementation, the system can sample multiple consecutive frames of an AV segment in order to detect motion features within the AV segment.

In one implementation, upon sampling a set of frames from the AV content or video segment, the system can extract AV or video features such as visual complexity features, motion features, and content features (e.g., a content classification, such as video games, sports, news). Generally, the system can sample and extract features corresponding to the entirety of an item of AV content (i.e., across all AV segments of a video or a livestream) or the system can sample and extract video features on a per-segment basis (e.g., corresponding to particular segments of the AV content). The system can then compile the extracted video features into a feature vector representing the video segment or the AV content.

In order to generate a set of visual complexity features for the feature vector of an AV segment, the system can: calculate a visual complexity metric (e.g., Shannon entropy or peak signal-to-noise ratio) for each frame in the sampled sequence of frames; and calculate a central tendency statistic (e.g., mean, harmonic mean, median) and/or a variance measure of this visual complexity metric to generate a visual complexity feature in the feature vector representing the AV content. The system can calculate the central tendency statistic and variance measure for each of a set of visual complexity metrics to obtain multiple visual complexity features in the video-level feature vector.

In another implementation, the system can also extract a set of motion features for inclusion in the segment-level or content-level feature vector. The system can: calculate a set of motion metrics characterizing the motion in consecutive (or adjacent) frames in the sequence of frames; and calculate a central tendency statistic and/or a variance measure of this motion metric to generate a motion feature in the segment-level or content-level feature vector. Thus, upon calculating a set of motion metrics for each consecutive set of frames in the sequence of frames, the system can merge the motion metrics into a set of motion features representative of the AV content or video segment.

The system can also calculate a set of content features for inclusion in the content-level or segment-level feature vector. In one implementation, the system can: separately classify each frame in the sampled sequence of frames into a predetermined set of content categories (e.g., sports, games, news). Thus, the system can then generate a content classification for each frame in the sampled sequence of frames. Alternatively, the system can input each frame of the sampled sequence of frames into a visual feature model such as a convolutional neural network for image classification (hereinafter "image classification model") such as a convolutional neural network characterized by the INCEPTION architecture (i.e., a neural network architecture characterized by multiple convolution filters operating at the same layer of the network). The system can utilize the image classification model to generate a frame-level feature vector for each frame, where each frame-level feature vector represents the classifiable visual features of the frame. In one example, the system can extract an intermediate layer activation (e.g., a layer immediately prior to the classification layer) from the image classification model as the frame-level feature vector for each frame. Thus, the system can extract a set of content features with more context regarding the content of the image than a singular classification of each frame.

Once the system obtains a set of frame-level content features (i.e. a single classification or a vector of frame-level features) for each frame in the sampling sequence of frames the system can then merge the frame-level content features for each frame into a set of content features in the content-level or segment-level feature vector, where these content features represent the content of the entire sequence of frames and, therefore, the whole AV segment or AV content. For example, the system can execute principle component analysis or any other dimensionality reduction technique on the set of frame-level feature vectors to obtain a set of content features for the sequence of frames.

The system can input the merged frame-level feature vectors into a taxonomic video classification model, such as a taxonomic video classification model trained on the YT8M dataset (or any other video or image dataset), to obtain a set of content features representative of the AV content or AV segment. In one example, the system can extract the set of content features from an intermediate layer (e.g., a layer immediately prior to the classification layer) of the taxonomic video classification model. Thus, the system can extract a video-level or segment-level feature vectors for the AV content or AV segment respectively including a set of visual complexity features, a set of motion features, and a set of content features.

In one implementation, the system can access feature vectors for previously streamed or recorded AV content generated by the same publisher as the current AV content in order to limit processing time of livestream content when predicting byterange-addressable parts size on a per-segment basis, thereby further reducing latency while transcoding livestreamed AV content.

6. Part Size Distribution Model

Generally, upon generating a feature vector for an AV segment the system can: receive an input for a target rendition (i.e., a bitrate and a resolution) and predict the size of byterange-addressable parts of the video segment when transcoded into the target rendition without first transcoding the video segment into the target rendition. More specifically, the system can estimate a part size distribution for the AV segment based on the set of video features of a video segment and a target rendition of the video segment in Block S120. For example, for two different target renditions, the system can estimate a first part size distribution of a first video segment based on a set of video features for a first target rendition; and estimate a second part size distribution of the first video segment based on the set of video features for a second target rendition.

In one variation, the system can estimate a part size distribution for individual video segments of AV content (e.g., a video stream) based on characteristics unique to each segment for a single rendition. For example, the system can, estimate a first part size distribution for the first video segment based on the first set of characteristics and a first target rendition; and estimate a second part size distribution for the second video segment based on the second set of characteristics and the first target rendition. Therefore, the system can isolate particular segments to generate estimations based on the part size distributions that are representative of video content in the particular video segments rather than the full AV content to capture changes in video characteristics between video segments.

In order to estimate a part size distribution for an AV segment, the system can train and execute a part size distribution model that takes as input a feature vector representing a video segment and a target rendition (i.e., a target bitrate and/or a target resolution) and generate a distribution of likely part sizes. Thus, the system can identify a range of possible part sizes given a particular type of AV content (characterized by the feature vector) and the corresponding likelihood of those part sizes in order to select a maximum target part size based on the distribution of part sizes.

6.1 Part Size Distribution Model Training

Generally, the system can train the part size distribution model based on a corpus of training examples, each training example can include a feature vector and a distribution of actual part sizes output by the transcoder over a set of predetermined renditions. For example, to generate the corpus of training examples, the system can extract a set of video features from example video segments and transcode these example video segments into a set of renditions. Once the system has transcoded each example video segment into a set of renditions, the system can capture the byterange-addressable part sizes for each transcoded segment in each rendition. Thus, the system can generate a set of training examples from a corpus of example video segments in order to fully characterize the behavior of the transcoder when applied to video segments.

In one implementation, the system executes a supervised machine learning model such as a deep artificial neural network and utilizes a backpropagation algorithm to train the deep artificial neural network based on the corpus of training examples. In this implementation, the system can execute a deep artificial neural network that outputs a vector indicating a likelihood of each part size in a range of part sizes. For example, the deep artificial neural network can output a vector representing the likelihood of a 20-byte part through the likelihood of a 10,000-byte part, such that each item in the vector represents the likelihood of a bin of part sizes. The system can visually represent the output vector as a likelihood distribution of part sizes or a part size distribution.

Once the system has trained the part size distribution model (or the part size distribution model has been pretrained by a cooperating computer system), the system can execute the part size distribution model during initial upload and/or ingest of AV content. The system can execute the part size distribution model on a per-video or per-segment basis. In one implementation, for livestreamed AV content, the system can execute the part size distribution model on similar content previously streamed by the same publisher or execute the part size distribution model on an initial segment of the livestream and utilize the output part size distribution for all subsequent segments of the livestream.

The system can execute the part size distribution model for each rendition advertised in the manifest file for the AV content (i.e., for the whole encoding ladder of the AV content) such that the system can execute just-in-time transcoding for any rendition of the AV content.

7. Maximum Target Part Size Selection

Generally, the system can select a maximum target part size based on a part size distribution for a video segment in order to generate a manifest file including predicted byterange addresses for parts of the video segment that have not yet been transcoded in Block S130. More specifically, the system can calculate a maximum target part size based on a predetermined or adaptive threshold percentile in a part size distribution. In one variation, the system can set a predetermined threshold percentile of 99% and, therefore, select a maximum target part size that exceeds 99% of target byterange-addressable parts output by the transcoder. The system can calculate a maximum target part size based on a part size distribution associated with a target rendition. For example, the system can calculate a first maximum target part size based on a threshold percentile in a first part size distribution for a first target rendition; and calculate a second maximum target part size based on the threshold percentile in a second part size distribution for a second target rendition. Additionally, or alternatively, the system can calculate a maximum target part size based on a part size distribution corresponding to a particular video segment. For example, the system can calculate a first maximum target part size based on a first threshold percentile in the first part size distribution for a first video segment; and calculate a second maximum target part size based on a second threshold percentile in the second part size distribution for a second video segment. Therefore, the system can characterize part sizes specific to target renditions and features unique to video segments.

In one implementation, the system can adapt the threshold percentile based on the overall likelihood that the transcoder generates a part greater than the maximum target part size in the duration of the AV content. For example, if a prerecorded video includes 1000 parts, then the system can set the maximum target part size at 99.9% plus some safety margin to ensure that the overall likelihood of a larger than target part being generated by the transcoder is low based on the duration of the AV content. Thus, the system selects a threshold percentile with which to select the maximum target part size that reduces the likelihood that any individual part generated by the transcoder exceeds the maximum target part size.

Generally, the system selects a threshold percentile for determining the maximum target part size based on acceptable error rate for the internet stream, which may be dynamically adjusted by an administrator of the system or automatically adjusted based on demand for the AV content.

8. Manifest File Generation and Transmission

Generally, at a first time prior to transcoding the video segment, the system can transmit, to an AV player, a manifest file indicating a set of byterange-addressable parts of the video segment in the first rendition, each byterange addressed part characterized by the maximum target part size in Block S140. Thus, upon selecting a maximum target part size for a video segment, the system can generate a manifest file enumerating byteranges for each part in the AV segment equal to the maximum target part range all without first transcoding the AV segment into each advertised rendition of the manifest file. For example, the system can, at a first time, for a first target rendition, generate a manifest file by: identifying a first set of parts specified by a first byterange based on the first maximum target part size for the first video segment; identifying a second set of parts specified by a second byterange based on the second maximum target part size for the second video segment; and aggregating the first and second set of parts. Therefore, the system can just-in-time transcode a first byterange-addressable part requested by an AV player and stream this part to the AV player within 500 milliseconds of the initial request and before completing the transcoding job for the entire AV segment.

In particular, the system can generate a manifest file for AV content that lists a playlist for each rendition in a transcoding ladder. Each playlist can specify a list of video segments that may be requested by an AV player. Additionally, each playlist can include a list of byteranges for each video segment corresponding to byterange-addressable parts of the video segment. The system can characterize each byterange listed in the manifest file for a given video segment based on the maximum target part size for the video segment. More specifically, for a first target rendition, if a video segment includes five byterange-addressable parts, and the maximum target part size for the video segment (as calculated by the part size distribution mode corresponding to that video segment) is 3000 bytes, the system can generate a playlist for the manifest file listing byteranges of 0-2999, 3000-5999, 6000-8999, 9000-11999, and 12000-14999 corresponding to each of the five parts respectively.

For example, at a first time, for a first target rendition, the system can: identify a first part of a first video segment specified by a first range of bytes based on the first maximum target part size; identify a second part in the first video segment specified by a second range of bytes based on the first maximum target part size; and generate a first playlist for the first target rendition by aggregating the first part and the second part in the first video segment. The computer system can further, for the second target rendition: identify a third part in the first video segment specified by a third range of bytes based on the second maximum target part size; identify a fourth part in the first video segment specified by a fourth range of bytes based on the second maximum target part size; generate a second playlist by aggregating the third part and the fourth part in the second video segment; and generate a manifest file by aggregating the first playlist and the second playlist. Therefore, the system can generate a manifest file including a comprehensive library of byterange parts for individual video segments for multiple renditions.

Upon generating a manifest file advertising the availability of each byterange-addressable part of each video segment in an item of AV content, the system can transmit the manifest file a set of AV players executing on user devices to stream the AV content. Therefore, the system can provide, to each AV player, a library of available byterange-addressable parts in multiple renditions that have not yet been transcoded by the system.

9. Header Prediction

In one implementation, the system can predict a header for each byterange-addressable part indicated in the manifest file defining a byte-location of each successive frame of the AV segment within a byterange-addressable part. More specifically, the system can: calculate a maximum target frame size for the frames of the byterange-addressable part (e.g., based on the part-size distribution model or a similar frame-size distribution model configured to predict a maximum target frame size based on the feature vector of the AV segment); and generate a header indicating the byte-position of each frame in the byterange-addressable part based on the maximum target frame size. Thus, the system can generate headers for the byterange-addressable part files that are properly recognized by the AV player.

Upon just-in-time transcode of a byterange-addressable part for which the system has predicted a header, the system can insert padding data between frames such that each frame is characterized by a size equal to the maximum target size. Thus, upon receiving a byterange-addressable part from the system, the AV player can retrieve frames in the locations defined in the header of the byterange-addressable part. The system can later update the header of the byterange-addressable part after the system removes excess padding data (e.g., in order to prevent unnecessary storage of padding data, as is further described below) to reflect the actual size of each frame of the byterange-addressable part.

In another implementation, the system can execute the part-size distribution model by multiplying the output of a frame-size distribution model by a number of frames defined for each byterange-addressable part. Thus, the system can inform the part-size distribution model by executing the frame-size distribution model.

10. Request Reception

Generally, at a second time, the system can receive, from an AV player, a playback request for a first byterange-addressable part in the set of byterange-addressable parts via the manifest file in Block S150. More specifically, the system can receive a request from an AV player indicating a byterange of a video segment corresponding to a byterange-addressable part of that video segment. The request from the AV player can further indicate the rendition of the requested byterange-addressable part in accordance with the playlist of the manifest file from which the AV player requested the byterange-addressable part. Therefore, in response to receiving a playback request, the system can initiate transcoding of the byterange-addressable part or query a rendition cache to identify a previously transcoded byterange-addressable part stored in the rendition cache.

11. Rendition Cache

In one implementation, upon receiving the request for the byterange-addressable part, the system can access a rendition cache corresponding to the target rendition to identify whether the requested byterange-addressable part is stored in the rendition cache. If the byterange-addressable part is present in the rendition cache, the system can stream the byterange-addressable part directly to the AV player. For example, the system can: receive a playback request for a part in the first video segment in a first target rendition; and, in response to identifying a rendition segment in the target rendition corresponding to the part in the rendition cache, streaming the rendition part to the video player for playback at the video player. Therefore, the system can reduce computational costs and time associated with transcoding parts of video segments by streaming already transcoded parts directly from the rendition cache.

In one implementation, if the system identifies that a byterange-addressable part is not in the rendition cache, the system can identify whether there is an open transcoding job for the byterange-addressable part at a worker and, upon identifying that an open transcoding job exists for the video segment corresponding to the byterange-addressable part, the system can stream the byterange-addressable part directly from the local cache of the worker (e.g., computer server) executing the transcoding job. For example, the system can: receive a playback request for a part in the video segment from the video player; in response to absence of the part in the target rendition in the rendition cache, identify an open transcoding job for the part at a worker; and, in response to identifying the open transcoding job for the video segment corresponding to the part at the worker, stream the part from a local cache associated with the worker executing the transcoding job. If no transcoding job exists and the byterange-addressable part is not in the rendition cache, the system can initiate a new just-in-time transcoding job for the video segment containing the byterange-addressable part.

11.1 Request Frequency Monitoring

In one implementation, the system can monitor changes in request frequencies for video segments and corresponding byterange-addressable parts and manage the rendition cache based on the changes. More specifically, the system can set a set of threshold request frequencies corresponding to target renditions. For example, the system can set a first threshold request frequency for a first rendition of an encoding ladder, and a second threshold request frequency for a second rendition of the encoding ladder.

The system can then monitor request frequencies of playback requests for byterange-addressable parts corresponding to video segments for multiple target renditions over an interval of time. More specifically, in response to identifying that a request frequency for a target rendition for a video segment falls below the threshold request frequency for the corresponding rendition during the interval of time, the system can discard the byterange-addressable parts corresponding to the video segment transcoded into the target rendition from the rendition cache associated with the target rendition. For example, the system can, in response to detecting a decrease in a request frequency of the rendition part in the rendition below a threshold request frequency, discard the rendition part from the rendition cache corresponding to the target rendition. Therefore, the system can reduce storage complexity by storing a library of video segments and corresponding parts transcoded into target renditions that are high in demand and frequently requested and discarding parts of video segments that are not frequently requested for playback.

12. Just-in-Time Part Transcoding

Generally, the system can execute the method S100 to transcode a byterange-addressable part into a renditions part based on the target rendition in response to receiving a request for the byterange-addressable part from an AV player in Block S160. In particular, the network can implement methods and techniques described in U.S. patent application Ser. No. 16/458,630 to just-in-time transcode parts of video segments into rendition parts and corresponding rendition segments.

In one variation, the system can query a corresponding rendition cache and transcode the video segment containing the byterange-addressable part into the target rendition specified by a target bitrate and resolution. For example, the system can, in response to absence of the part in the target rendition in the rendition cache, transcode the part in the video segment into the target rendition to generate a rendition part to identify a size of the rendition part, and prompt the system to append padding data to the rendition part.

12. Padding Data

Generally, the system can execute the method S100 to append padding data to the transcoded rendition parts to generate a part size that is characteristic of the maximum target part size. In one implementation, because the system can indicate larger than target byteranges for each part in the video segment in the manifest file, the system can insert padding data between each byterange-addressable part when transcoding the video segment. More specifically, the system can receive a playback request for a byterange of 0-2999 in a video segment, which corresponds to the maximum target part size for the video segment—3000 bytes. However, the actual transcoded length of the part, which is characterized by a fixed playback duration (e.g., a 500-millisecond playback duration), can be less than 3000 bytes. For example, the system can: in response to the maximum target part size exceeding a rendition part size of the rendition part, append a set of padding data to the rendition part. Thus, the system can append padding data to the end of each transcoded part less than the maximum target part size in order to deliver requested byterange-addressable parts of the target size to the AV player, thereby preventing playback errors at the AV player. More specifically, in response to the maximum target part size exceeding a size of the byterange-addressable part in the requested rendition, the system can append padding data to the first byterange-addressable part in Block S170.

12.1 Padding Schemes

In one implementation, the system can append padding data (e.g., a padding scheme) to one or both ends of each byterange-addressable part based on a target compression type. The system can characterize a compression type (e.g., MP4, MOV, etc.) based on characteristics of the AV player requesting the video segment and the target rendition. More specifically, the system can append a first set of padding data—such as a string of fixed values or characters (e.g., repeating "0")—to a rendition part when the AV player specifies a first compression type and append a second set of padding data (e.g., duplicating a portion of the rendition part and concatenating the duplicate and the rendition part) to the rendition part when the AV player specifies a second compression type.

For example, the system can, in response to a maximum target part size exceeding a size of the first rendition part: identify a first compression type for the rendition part based on the AV player; select a first set of padding data specified by a first padding scheme corresponding to the first compression type; and append the first set of padding data to the first rendition part. The system can then: in response to a maximum target part size exceeding the size of a second rendition part in a second rendition: identify a second compression type for the rendition part based on the AV player; select a second set of padding data specified by a second padding scheme corresponding to the second compression type; and append the second set of padding data to the second rendition part. Thus, the system can reduce playback errors of the video segments at the AV player by delivering the requested byterange-addressable parts in the target size to the AV player that are compatible to the AV player.

In another implementation, the system can store the actual byteranges of each part generated during the transcoding process such that the system can subsequently trim the transcoded video segment to remove padding data and update manifest files according to the actual length of each byterange-addressable part in the video segment. Therefore, the system can conserve storage space and reduce the amount of data transmitted to AV players when streaming the AV segment in response to future requests.

In one implementation, the system can identify that a part size of a transcoded byterange-addressable part is characteristic of the maximum target part size calculated based on the part size distribution for the target rendition. More specifically, the system can transcode a byterange-addressable part of a video segment characteristic of a part size and identify that the part is specified by a byterange of 0-2999 in a video segment, corresponding to maximum target part size for the video segment of 3000 bytes. If the system identifies the part size as the maximum target part size for the video segment, the system can transmit the byterange-addressable part transcoded into the target rendition to the AV player without appending padding data to the part. For example, the system can, in response to a part size of a first rendition part exhibiting the maximum target part size, transmit the first rendition part to the video player for playback at the video player. Therefore, the system can reduce bandwidth of parts by withholding the addition of padding data when padding data is not necessary and sending the byterange-addressable part, transcoded into the target rendition, to the AV player for playback.

14. Part Compression

In one implementation, the system can compress the transcoded byterange-addressable parts based on a compression type specified the AV player or the target rendition prior to transmitting the parts to the AV player for playback. More specifically, the system can implement a codec to reduce a size of a file containing the video segment. For example, the system can compress the first rendition part from the first maximum target part size to a first compression part size smaller than the first maximum target part size specified by the first compression type to generate a first compressed part size; and compress the second rendition part from the second maximum target part size to a second compression part size smaller than the second maximum target part size specified by the second compression type to generate a second compressed part size. Therefore, the system can reduce latency in video segment transmission to the AV player by reducing a size of the data file or packet for sending to a device.

15. Part Delivery

Generally, the system can, in response to transcoding the byterange-addressable part into the target rendition, transmit the byterange-addressable part to the AV player for playback at the AV player in Block S180. More specifically, upon completing transcoding for a byterange-addressable part and appending padding data to the byterange-addressable part, the system can stream the byterange-addressable part to the requesting AV player for playback by the requesting AV player. In particular, the system can transmit the byterange-addressable part at line-speed (as opposed to transcode-speed) via the content delivery network, such that the requesting AV player can accurately estimate the bitrate of the stream. In one variation, the system can transmit the compressed byterange-addressable part to the AV player in Block 182. For example, the system can, in response to compressing the rendition part to a compressed part, transmit the first compressed part to the video player.

15.1 Inter-Segment Transcoding

In one implementation, the system can initiate transcoding of a byterange-addressable part during transmission of a preceding byterange-addressable part transcoded into the target rendition. More specifically, the system can receive a playback request for a consecutive set of byterange-addressable parts in a video segment. The system can: transcode a first part into the target rendition; trigger transcoding of a proceeding part in the video segment into the target rendition; and, during transcoding of the proceeding part or during appending the proceeding part with padding data, transmit the first part to the AV player for playback. For example, the system can: receive a playback request for a second part in a set of parts of the first video segment in the first target rendition; while transmitting the first compressed part to the video player, initiating transcoding of a second part to generate a second rendition part in the first target rendition; and, upon completion of transcoding, transmit the second rendition part to the video player. Therefore, the system can reduce latency in transmitting transcoded Parts to the AV player by initiating transcode and transmission of subsequent parts sooner, rather than waiting to until transmission of a part to being transcoding of a subsequent part. Thus, the system can reduce playback errors (e.g., strobing) at the AV player while streamlining playback of parts.

16. Intra-Segment Scene Identification

In one implementation, the system can identify scenes in the video segments based on recognized video characteristics to predict maximum target part sizes for subsequent video segment during future instances of those scenes. More specifically, during a film or a video, a particular scene—including a static background image, a set of characters, and a static resolution—may repeat multiple times during a video segment and between multiple video segments. The system can identify a set of spatial and temporal characteristics (e.g., motion vectors, resolution differences, etc.), during an interval of time to identify a presence of the scene in the video segment. The system can then access a subsequent video segment and identify the characteristics—specifically a repetition of the characteristics in the subsequent video segment—to identify the scene. For example, the system can: identify a set of spatial and temporal characteristics in the first set of video features in a first video segment; classify a first scene in the first video segment based on the set of spatial and temporal characteristics during a time interval; and estimate a part size distribution for the first video segment based on the set of spatial and temporal characteristics. The system can then: ingest a second video segment associated with a second set of video features; identify the scene in the second video segment based on a repetition of the first set of spatial and temporal characteristics in the second set of video features; and predict the target part size for the second video segment based on the part size distribution for the first video segment. Therefore, the system can reduce computational cost of estimating additional part size distributions and computing additional maximum target part sizes when the system has already identified video segments with similar characteristics and features and estimated corresponding part size distributions.

In one variation, based on a target rendition and a target compression type, the system can identify scenes in the video segments based on recognized video characteristics and predict padding schemes for subsequent video segments during future instances of those scenes. For example, the system can: ingest a second video segment associated with a second set of video features and a target compression type; identify the scene in the second video segment based on the first set of spatial and temporal characteristics in the second set of video features; and predict a padding scheme for the second video segment based on the part size distribution for the first video segment and the target compression type. Therefore, the system can reduce latency in transmitting video segments to the AV player by appending padding data to subsequent rendition parts based on previously padded rendition parts.

17. Inter-Segment Similarity-Based Predictions

In one implementation, the system can identify similarities between video segments—a previously ingested and transcoded video segment and a newly ingested video segment—to generate predictions for maximum target part sizes based on similar video features and characteristics. More specifically, the system can detect a set of spatial and temporal characteristics in the video features of video segments and generate a feature vector for each video segment specifying values of corresponding characteristics. The system can then compute a similarity score between a feature vector for a first video segment and a feature vector for a second segment. The system can compare the similarity score to a similarity score threshold to identify whether the video segments are classified as similar to each other. The system can set a similarity score threshold based on a target rendition or for a particular AV player.

In response to the similarity score exceeding the similarity score threshold, the system can predict the maximum target part size based on part size distribution for the previously transcoded video segment and update the manifest file to indicate a set of parts for the segment based on the predicted maximum target part size. In response to the similarity score falling below the similarity score threshold, the system can estimate a part distribution for the new segment based on the video features in the video segment to calculate a maximum target part size for that video segment.

For example, the system can: ingest a first video segment associated with a first set of video features; ingest a second video segment associated with a second set of video features; detect a second set of spatial and temporal characteristics in the second video segment; calculate a similarity score between the first video segment and the second video segment based on a first set of spatial and temporal characteristics in the first set of video features of the first video segment and the second set of spatial and temporal characteristics of the second video segment; in response to the similarity score exceeding a similarity score threshold, predict the target part size based on part size distribution; and update the manifest file to specify a second set of parts for the second video segment, each part characterized by the target part size. Therefore, the system can reduce latency in, and computational resources associated with transcoding and transmitting byterange-addressable parts by predicting part sizes when the system detects similarities between video segments.

In one variation, the system can ingest AV content including AV segments similar to each other or similar to video segments of previously ingested AV content and assign maximum target part sizes based on the previously ingested video segments. More specifically, the system can identify similarities between the set of spatial and temporal characteristics of multiple video segments and assign the maximum target part size for a target rendition from a video segment previously ingested and transcoded to a new video segment with similar features. The system can then update the manifest file for the new video segment based on the maximum target part size.

For example, the system can: ingest a second video file comprising a video segment; detect a set of spatial and temporal characteristics in the second video segment; calculate a similarity score between the second video segment and a first video segment based on the first set of spatial and temporal characteristics of the first video segment and a second set of spatial and temporal characteristics of the second video segment; and, in response to the similarity score exceeding a similarity score threshold, identifying a set of parts for the video segment based on the maximum target byterange for the first segment. Therefore, the system can reduce computational costs associated with estimating subsequent part size distributions and calculating maximum target part sizes when newly ingested video segments exhibit similar features to parts of previously transcoded video segments.

18. Manifest File Update

In one implementation, the system can update the manifest file to maintain a library of actual byteranges and sizes of transcoded byterange-addressable parts absent padding data each time the system receives a playback request for a part of a video segment. For example, upon transcoding a byterange-addressable part of a video segment into a rendition part for the requested target rendition, recording the byterange of each rendition part for the video segment, and transmitting the requested rendition part to the requesting AV player, the system can: remove the padding data from the rendition part; store the rendition parts for the video segment in the rendition cache corresponding to the target rendition; and update the manifest file for the AV content to reflect the actual byteranges of each rendition part for the video segment. Thus, as the system receives requests to transcode subsequent video segments of the AV content, the system can continually update the manifest file to reflect accurate byteranges for the set of byterange-addressable parts of the AV content already transcoded by the system in order to prevent storage of padding data in the rendition cache. Thus, the system can reduce the amount of data transmitted to AV players in response to future playback requests.

In one implementation, the system can update the manifest file with byterange-addressable parts based on the predicted maximum target part size from similar video segments. For example, the system can: detect a set of video features in a second video segment; calculate a similarity score between the first video segment and the second video segment based on the set of video features; in response to the similarity score exceeding a similarity score threshold, for the first target rendition, predicting the first maximum target part size based on the first part size distribution and the set of video features in the second video segment; and, in response to the similarity score exceeding a similarity score threshold, for a second target rendition, predicting the second maximum target part size based on the second part size distribution and the set of video features in the second video segment. The system can then: update the first playlist in the manifest file to indicate a first set of parts of the second video segment in the first target rendition, each part characterized by the first maximum target part size; and update a second playlist in the manifest file to indicate a second set of parts of the second video segment in the second target rendition, each part characterized by the second maximum target part size. Therefore, as the system predicts subsequent maximum target part sizes based on new video segments that are similar to previously ingested video segments, the system can thereby store the predicted byterange-addressable parts for the video segments in the manifest file. Thus, the system can reduce latency in video segment transmission by implementing predicted byteranges rather than generating subsequent estimations for part size distributions and computing additional target part sizes.

19. Byterange Prediction Throttling

In one implementation, the system can throttle (i.e., adaptively activate and deactivate and remove byterange-addressable parts from the manifest file) byterange prediction based on the latency demanded for AV content. For example, the system can: for a first subset of video segments of the AV content, predict byteranges for the byterange-addressable parts; and, for a second subset of video segments in the AV content, deactivate byterange prediction. Thus, the system can reduce the latency of just-in-time transcoding for the first subset segments of the video, while preemptively transcoding the subsequent segments and storing them in the rendition cache prior to receiving requests for these subsequent segments. Therefore, by only activating the byterange prediction steps described above for the first subset of segments, the system further reduces upfront computing costs that would be utilized in predicting part sizes in the subset of subsequent segments.

20. Inter-Video Learning

Generally, the system can execute the method S100 to predict maximum target part sizes and padding schemes not only across video segments of a single ingested AV content but also between multiple AV content. More specifically, the system can generate a matrix representative of AV content characteristics for a first AV content, such as a set of spatial and temporal characteristics of video segments (e.g., a film, a video clip, etc.), manifest file data, maximum target part sizes indexed corresponding to video segments in the manifest file, padding schemes for requested rendition segments, etc. The system can then aggregate a similar set of AV characteristics for a second AV content to generate a matrix representative of the second AV content. The system can then implement a video learning model to generate predictions for maximum target part sizes and padding schemes of video segments included in subsequent AV content based on previous AV content. Upon ingesting a film (e.g., a sequel to a movie, etc.), the system can implement the video learning model to identify similarities between the film and previously ingested AV content to predict maximum target part sizes for video segments in the film and padding schemes for the corresponding rendition parts.

For example, the system can: ingest a first AV content; generate a first matrix characteristic of features of a first AV content, ingest a second AV content; generate a second matrix characteristic of features of the second AV content; train a video learning model to predict a set of first maximum target part sizes and a first set of padding schemes based on the first matrix and the second matrix, ingest a third AV content; generate a third matrix characteristic of features of the third AV content; and implement the video learning model to predict the set of first maximum target part sizes and a first set of padding schemes for the third AV content. Therefore, the system can generate a robust learning model to predict maximum target part sizes for video segments in the film and padding schemes for the corresponding rendition parts based on previous AV content. Thus, the system can reduce computational costs and latency associated with transmitting requested rendition parts to AV players for playback.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

at a first time:

for a first target rendition:

accessing a first part size distribution model associated with the first target rendition;

identifying a first media part, in a first media segment, characterized by a first range of bytes defined by a first target part size according to the first part size distribution model;

identifying a second media part, in the first media segment, characterized by a second range of bytes based on the first target part size according to the first part size distribution model;

generating a first playlist based on the first media part and the second media part in the first media segment; and for a second target rendition:

accessing a second part size distribution model associated with the second target rendition;

identifying a third media part, in the first media segment, characterized by a third range of bytes according to the second part size distribution model;

identifying a fourth media part, in the first media segment, characterized by a fourth range of bytes according to the second part size distribution model; and generating a second playlist based on the third media part and the fourth media part in the first media segment;

generating a manifest file based on the first playlist and the second playlist; and publishing the manifest file for access by a media player.

2. The method of claim 1, further comprising:

at a second time, receiving a first playback request for the first media part from the media player;

in response to absence of the first media part in the first target rendition in a rendition cache, transcoding the first media part of the first segment into the first target rendition to generate a first rendition part;

in response to the first target part size exceeding a first part size of the first rendition part, appending a first set of padding data to the first rendition part; and serving the first rendition part to the media player.

3. The method of claim 1:

further comprising detecting a first set of media features in the first media segment;

wherein identifying the first media part comprises:

estimating a first part size distribution of the first media segment based on the first set of media features and the first part size distribution model; and calculating the first target part size based on a threshold percentile part size in the first part size distribution for the first target rendition;

wherein identifying the third media part comprises:

estimating a second part size distribution of the first media segment based on the first set of media features and the second part size distribution model; and calculating a second target part size based on the threshold part size in the second part size distribution for the second target rendition.

4. The method of claim 2:

wherein appending the first set of padding data to the first rendition part comprises appending the first set of padding data to the first rendition part based on a first padding scheme corresponding to a first compression type;

further comprising compressing the first rendition part from the first target part size to a first compression part size smaller than the first target part size to generate a first compressed part; and wherein serving the first rendition part comprises serving the first compressed part to the media player.

5. The method of claim 4, further comprising:

at the second time, receiving a second playback request for the third media part from the media player;

in response to absence of the third media part in the second target rendition in the rendition cache, transcoding the third media part into the second target rendition to generate a second rendition part;

in response to the second target part size exceeding a second part size of the second rendition part, appending a second set of padding data to the second rendition part based on a second padding scheme corresponding to a second compression type;

compressing the second rendition part from the second target part size into a second compression part size less than the second target part size to generate a second compressed part; and serving the second compressed part to the media player.

6. The method of claim 3, further comprising:

detecting a second set of media features in a second media segment;

calculating a similarity score between the first set of media features and the second set of media features for the second segment;

for the first target rendition:

in response to the similarity score exceeding a similarity score threshold, predicting the first target part size for parts in the second media segment based on the first part size distribution and the second set of media features in the second media segment; and updating the manifest file to indicate a first set of parts of the second media segment in the first target rendition, each part in the first set of parts characterized by the first target part size; and for the second target rendition:

in response to the similarity score exceeding the similarity score threshold, predicting the second target part size for parts in the second media segment based on the second part size distribution and the second set of media features in the second media segment; and updating the manifest file to indicate a second set of parts of the second media segment in the second target rendition, each part in the second set of parts characterized by the second target part size.

7. The method of claim 1, further comprising:

setting a first target quality associated with playback of the first media part in the first media segment;

selecting the first target rendition based on the first target quality;

setting a second target quality associated with playback of the third media part in the first media segment; and selecting the second target rendition based on the second target quality.

8. The method of claim 1, further comprising:

receiving a first playback request for the first media part from the media player;

in response to absence of the first media part in the first target rendition in a rendition cache, transcoding the first media part of the first segment into the first target rendition to generate a first rendition part; and in response to the first part size of the first rendition part exhibiting the first target part size, serving the first rendition part to the media player for playback at the media player.

9. The method of claim 1, further comprising:

receiving a second playback request for the third media part in the first media segment from the media player;

in response to absence of the third media part in the second target rendition in the rendition cache, identifying an open transcoding job for the third media part at a worker; and in response to identifying the open transcoding job for the first media segment corresponding to the third media part at the worker, streaming the third media part from a local cache, associated with the worker executing the transcoding job, to transcode the third media part into the second target rendition.

10. The method of claim 1, further comprising:

at a third time, receiving a third playback request for the third media part in the first media segment in the second target rendition;

in response to identifying a third rendition part in the second target rendition corresponding to the third media part in the rendition cache, streaming the third rendition part to the media player for playback at the media player;

receiving a fourth playback request for the fourth media part in the first media segment in the second target rendition;

identifying absence of a fourth rendition part in the second target rendition in the rendition cache;

while serving the third rendition part to the media player, initiating transcode of the fourth media part to generate a fourth rendition part in the second target rendition; and in response to generating the fourth rendition part, serving the fourth rendition part to the media player for playback proceeding the third rendition part.

11. A method comprising:

ingesting a first media file comprising a first media segment and a second media segment;

identifying a first set of parts specified by a first range of bytes based on a first target part size for the first media segment;

identifying a second set of parts specified by a second range of bytes based on a second target part size for the second media segment; and identifying a first rendition, defined by a first bitrate, based on the first range of bytes;

identifying a second rendition, defined by a second bitrate, based on the second range of bytes; and aggregating the first rendition and the second rendition into a manifest file;

publishing the manifest file for access by a media player;

receiving a first playback request for a first part in the first set of parts, from the media player;

in response to absence of the first part in the first rendition in a rendition cache, transcoding the first part into the first rendition to generate a first rendition part for access by the media player.

12. The method of claim 11, further comprising:

detecting a first set of characteristics in the first media segment;

detecting a second set of characteristics in the second media segment;

estimating a first part size distribution of the first media segment based on the first set of characteristics and a first part size distribution model associated with the first target rendition;

estimating a second part size distribution of the second media segment based on the second set of characteristics and the first part size distribution model associated with the first target rendition;

calculating the first target part size based on a first threshold part size in the first part size distribution for the first media segment; and calculating the second target part size based on a second threshold part size in the second part size distribution for the second media segment.

13. The method of claim 11, further comprising:

detecting a first set of characteristics in the first media segment;

detecting a second set of characteristics in the second media segment;

estimating a first part size distribution of the first media segment based on the first set of characteristics and a first part size distribution model associated with the first target rendition;

calculating a similarity score for the first set of characteristics in the first media segment and the second set of characteristics in the second media segment;

in response to the similarity score exceeding a threshold similarity score, associating the first part size distribution with the second media segment;

calculating the first target part size based on the first part size distribution for the first media segment; and calculating the second target part size based on the first part size distribution for the second media segment.

14. The method of claim 11, further comprising:

receiving a second playback request for a second part in the second set of parts, from the media player; and in response to identifying the second part in the first target rendition in the rendition cache, streaming the second part to the media player.

15. The method of claim 11, further comprising:

in response to the first target part size exceeding a first rendition part size of the first rendition part, appending a first set of padding data to the first rendition part;

receiving a second playback request for a second part, in the second set of parts, from the media player;

transcoding the second part into a second target rendition to generate a second rendition part;

in response to the second target part size exceeding a second part size of the second rendition part, appending a second set of padding data to the second rendition part;

compressing the second rendition part from the second target part size to a second compression part size smaller than the second target part size to generate a second compressed part; and serving the second compressed part to the media player.

16. A method comprising:

ingesting a first media segment;

defining a target rendition based on first range of bytes of the first media segment;

generating a manifest file for the first media segment, the manifest file specifying the target rendition and file indicating a set of parts of the first media segment in the first target rendition, each part in the set of parts characterized by a target part size;

publishing the manifest file for access by a media player;

receiving, from the media player, a playback request for the first part in the set of parts based on the manifest file;

generating a first rendition part in the first target rendition by transcoding the first part;

in response to the target part size exceeding a size of the first rendition part, appending a first set of padding data to the first rendition part; and serving the first rendition part to the media player.

17. The method of claim 16:

wherein ingesting the first media segment comprises ingesting the first media segment associated with a first set of media features; and further comprising:

estimating a part size distribution for the first media segment based on the first set of media features and a first part size distribution model associated with the first target rendition of the first media segment; and calculating the target part size based on a threshold part size in the part size distribution.

18. The method of claim 17, further comprising:

further comprising:

identifying a set of characteristics in the first set of media features; and classifying a first scene in the first media segment based on the set of characteristics;

ingesting a second media segment associated with a second set of media features;

detecting the set of characteristics in the second set of media features identifying the first scene in the second media segment according to the set of characteristics; and predicting the target part size for the second media segment based on the part size distribution for the first media segment.

19. The method of claim 16:

wherein serving the first rendition part to the media player comprises:

generating a first compressed part by compressing the first rendition part from the target part size to a first compression part size smaller than the target part size; and serving the first compressed part to the media player; and further comprising:

at a third time, receiving a second playback request for a second part in the set of parts of the first media segment in the first rendition; and upon serving the first compressed part to the media player, initiating transcode of the second part generate a second rendition part in the first target rendition.

20. The method of claim 16, further comprising:

detecting a first set of characteristics in the first media segment;

ingesting a second media segment associated with a second set of media features;

detecting a second set of characteristics in the second media segment;

calculating a similarity score between the first media segment and the second media segment based on the first set of characteristics of the first media segment and the second set of characteristics of the second media segment;

in response to the similarity score exceeding a similarity score threshold, predicting the target part size based on the part size distribution; and updating the manifest file to specify a second set of parts for the second media segment, each part in the second set of parts characterized by the target part size.

* * * * *